US006891105B1

(12) United States Patent
Bach et al.

(10) Patent No.: US 6,891,105 B1
(45) Date of Patent: May 10, 2005

(54) CONNECTING BARS FOR ELECTRICAL APPLIANCES AND DEVICES FOR DIFFERENT NOMINAL CURRENTS

(75) Inventors: Michael Bach, Berlin (DE); Detlev Schmidt, Berlin (DE); Michael Sebekow, Berlin (DE); Guenter Seidler-Stahl, Berlin (DE); Ingo Thiede, Berlin (DE); Sezai Tuerkmen, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 22 days.

(21) Appl. No.: 10/049,820

(22) PCT Filed: Aug. 11, 2000

(86) PCT No.: PCT/DE00/02779

§ 371 (c)(1), (2), (4) Date: Feb. 19, 2002

(87) PCT Pub. No.: WO01/13391

PCT Pub. Date: Feb. 22, 2001

(30) Foreign Application Priority Data

Aug. 18, 1999 (DE) .......................................... 199 39 710

(51) Int. Cl.[7] .................................................. H02G 5/00

(52) U.S. Cl. ...................... 174/68.2; 439/207; 439/884; 439/885; 439/638; 439/66

(58) Field of Search ......................... 174/68.2; 439/207, 439/884, 885, 638, 66; 200/289, 275, 280

(56) References Cited

U.S. PATENT DOCUMENTS

| | | | | | |
|---|---|---|---|---|---|
| 3,584,138 | A | * | 6/1971 | Pritzen, Jr. | 174/68.3 |
| 3,597,713 | A | | 8/1971 | McClain | |
| 3,609,215 | A | * | 9/1971 | Giger et al. | 174/88 B |
| 3,953,695 | A | | 4/1976 | Bron et al. | |
| 4,030,794 | A | | 6/1977 | Rozenboom et al. | |
| 4,720,613 | A | | 1/1988 | Adam | 200/146 |
| 4,820,178 | A | * | 4/1989 | Anderson et al. | 439/212 |

FOREIGN PATENT DOCUMENTS

| | | |
|---|---|---|
| DE | 717068 | 2/1942 |
| DE | 1 092 995 | 11/1960 |
| DE | 35 39 673 A1 | 5/1997 |
| DE | 196 43 607 A1 | 11/1997 |
| DE | 199 30 813 A1 | 1/2001 |
| FR | 2 484 135 | 12/1981 |

* cited by examiner

*Primary Examiner*—Dean A. Reichard
*Assistant Examiner*—Jinhee Lee
(74) *Attorney, Agent, or Firm*—Harness, Dickey & Pierce P.L.C.

(57) ABSTRACT

Connecting bars for electrical appliances and devices, for different nominal currents, are configured in such a way that they are hollow. They may have only one or more than one cavity. The connecting bars have the same outer cross section for all current intensities, have different wall thicknesses, and consequently have differently sized cavities, for different current intensities. Consequently, the lead-through openings for the connecting bars in the respective switch housings of a type series can all be configured identically, corresponding to the dimensions for the connecting bars of the maximum current intensity.

18 Claims, 2 Drawing Sheets

CONNECTING BARS FOR ELECTRICAL APPLIANCES AND DEVICES FOR DIFFERENT NOMINAL CURRENTS

This application is the national phase under 35 U.S.C. § 371 of PCT International Application No. PCT/DE00/02779 which has an International filing date of Aug. 11, 2000, which designated the United States of America, the entire contents of which are hereby incorporated by reference.

FIELD OF THE INVENTION

The invention generally relates to connecting bars. Preferably, it relates to connecting bars made of profiled semi-finished material for electrical appliances and devices for the connection of electrical components of the electrical appliances and devices to an external circuit. More preferably, the connecting bars include the same outer cross section for nominal currents of different levels and are accommodated in a wall of the appliances or devices, in a window opening adapted to the cross section, and preferably fixed on the wall by a fastener.

BACKGROUND OF THE INVENTION

On the part of a connecting bar led throughout of the housing to the outside, such as that described in FR 2 484 135 A1, an equipment-side power feeding bar can be connected in this way. The connecting bar is in this case generally arranged securely in the insulating wall of an appliance or device, which can take place for example by clamping bolts.

According to the above-mentioned FR 2 484 135 A1, the connecting bars are adapted to the different nominal currents by putting together the standard cross section of a plurality of pieces, which consist of copper or aluminum. For the highest intended nominal current, only pieces made of copper are used, while for the lowest intended nominal current only pieces of aluminum are used. For nominal currents lying in between, the connecting bars have combinations of pieces made of the two materials, for example one piece made of copper, three pieces made of aluminum.

There is also the proposal (earlier patent application with the application number DE 199 30 813.6, published as DE 199 30 813 A1) of producing connecting bars from sections of a profiled semi-finished material which include webs or ribs, which add to a cross section dependent on the nominal current to give a spacing dimension that is the same for all nominal currents. This makes it unnecessary to use different materials and a plurality of pieces.

Connecting bars of the type stated above may at the same time have a feature disclosed by DE 196 43 607 A1, that is a further projection (web, rib), which serves as an axial positioning and supporting device for the connecting bar on the wall of the housing of the appliance or device. Further fasteners are then either not required at all or only required in a simplified form. If bolts are used as such fasteners, they can engage in a nut thread, which is formed in a known way by a metallic insert nut or press-in nut located in the insulating material of the wall (DE 35 39 673 A1).

It follows from the descriptions given above that the current-carrying capacity, heat dissipation, provision of a surface for connections of power feeding bars and the absorption and transmission of static and dynamic forces are among the main tasks of the connecting bars. In addition, it is intended for it to be possible to accommodate connecting bars for different current intensities in walls with standard lead-through openings.

SUMMARY OF THE INVENTION

An object of the present invention is therefore to provide connecting bars which have the properties mentioned and can be produced inexpensively.

This object is achieved according to the invention, for example, by the connecting bars being configured in such a way that they are hollow, with the same outer cross section, and with the remaining wall thickness being adapted to the respective nominal current.

A current-carrying hollow arrangement is already described in U.S. Pat. No. 3,597,713, which shows an apparatus as a substitute for a high-voltage fusible link, in which a combination of a vacuum switch with an operating handle, which includes a lug in a way similar to a high-voltage or medium-voltage circuit breaker, is represented. Installed in a hollow connecting piece of the apparatus is an electronic circuit. Although this discloses a current-carrying hollow part on an electrical switching device, it serves only for accommodating another component of the apparatus, that is the electronic circuit, and not for regulating the current-carrying capacity of the subassembly.

A switching apparatus described in U.S. Pat. No. 3,953,695 likewise has a hollow connector. A coolant is passed through the cavity, since it is a heavy-current switching device and the dimensions of the connector are to be restricted. By contrast with the invention, it is therefore not based on an outer cross section which corresponds to the highest current value, with the cavity depending on the nominal current respectively intended.

In contrast to this, in the case of the connecting bars according to the invention the current-carrying capacity is regulated by use of the wall thickness of the hollow bar which forms the conducting, current-carrying cross section. It follows from this that, in the case of lower current intensities, there is a larger internal cavity as a result of lower wall thicknesses, or in the case of higher current intensities there is a smaller internal cavity as a result of thicker wall thicknesses, which can be taken to the extent of a solid configuration without a cavity, in the case of the highest rated current intensity. The lead-through openings in the respective housings of the appliances or devices are then designed for the outer dimensions required for this highest rated current intensity.

It may be expedient to provide the connecting bars with only one cavity. Various aspects, in particular the size of the overall outer cross section, may however favor the provision of a plurality of cavities.

In the case of connecting bars, bores may be required, formed with or without a thread, for example for purposes of fastening on the housing or against axial displacement. These bores may be arranged in a common axis or else offset with respect to one another. To avoid deformation of the hollow connecting bars being caused by the clamping force of the bolts led through these bores or screwed into the thread of these bores, suitable webs may be provided between the cavities of the connecting bars for increasing the strength. With respect to the production of the profiled material, this possibly includes extra expenditure, but has no influence on the current-carrying capacity.

To avoid this possible extra expenditure, guiding grooves running transversely with respect to the longitudinal direction of the connecting bar may also be provided in the cavity of the connecting bar for supporting webs which are to be pushed in as and when required. The supporting webs to be pushed into these guiding grooves may include the same material as the connecting bar, but may also include a different material.

These pushed-in supporting webs serve the same purpose as the molded-on supporting webs, that is to stabilize the connecting bar against deformation of the hollow connecting bar caused by the clamping force or loading exerted by screw bolts led through the bores or bolts screwed into the thread of these bores.

Since these pushed-in supporting webs have no influence on the current-carrying capacity, other aspects, such as for example strength, can be taken into consideration as assessment parameters for the selection of the material.

The bores mentioned above, formed with or without a thread, may be arranged in the region of cavities, which is expedient in particular whenever the bolts are led through, these bolts then having to have a common axis and not requiring any thread.

If the bores are formed with a thread, it may be advantageous to arrange them in such a way that they are located in a web. This makes larger thread lengths possible, which allows the screwed connection to be subjected to higher loading.

To avoid fastening bores, the connecting bars may also be provided with stops known per se for axial fixing. They are then fixed in the axial direction by suitable fastening elements known per se, for example clamping bolts. At the same time or in addition, stops of this type can absorb axial forces and transmit them to the housing.

In the case of all the connecting bars described above, the cavity or cavities can be arranged transversely with respect to the longitudinal extent of the connecting bar and be open on both sides. In this configuration, an extruded part can be advantageously produced as the starting material, from which individual connecting bars of a respectively required width can be cut off.

BRIEF DESCRIPTION OF THE DRAWINGS

The invention is to be explained in more detail below for better understanding on the basis of preferred examples, which do not restrict the extent of protection of the invention, with reference to the associated drawing.

DETAILED DESCRIPTION OF THE PREFERRED EMBODIMENTS

Figure 1:
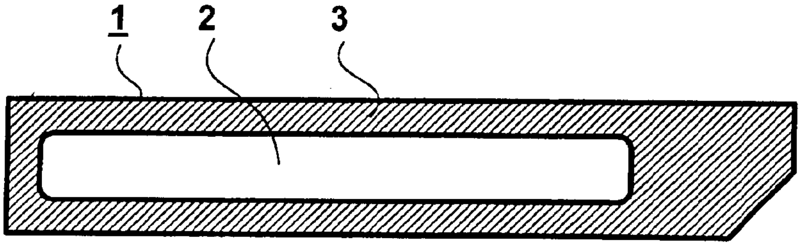
FIG. 1 schematically shows a first embodiment of a connecting bar, for a low current intensity.

FIG. 1 shows a first embodiment of a connecting bar 1 for electrical appliances and devices for a low current intensity. In this embodiment, it preferably includes only a single cavity 2, which extends essentially over it its entire dimension. This connecting bar 1 has a thinner wall 3, adapted to the low operating current. Since the outer dimensions, that is the outer cross section of the connecting bar 1, is intended to represent a constant, the cavity 2 is relatively large because of the small wall thickness.

Figure 2:
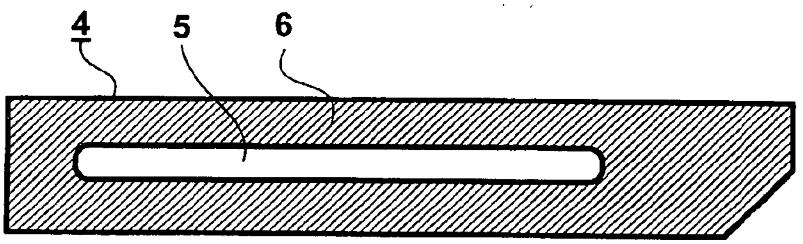
FIG. 2 schematically shows a second embodiment of a connecting bar, for a higher current intensity.

FIG. 2 shows a second embodiment of a connecting bar 4 for electrical appliances and devices for a higher current intensity. In this embodiment, it likewise preferably includes only a single cavity 5, which extends essentially over its entire dimension. This connecting bar 4 has a thicker wall 6, adapted to the higher operating current. Since the outer dimensions, that is the outer contour of the connecting bar 4, is likewise intended to represent a constant, the cavity 5 is relatively small because of the thicker wall thickness.

Figure 3:
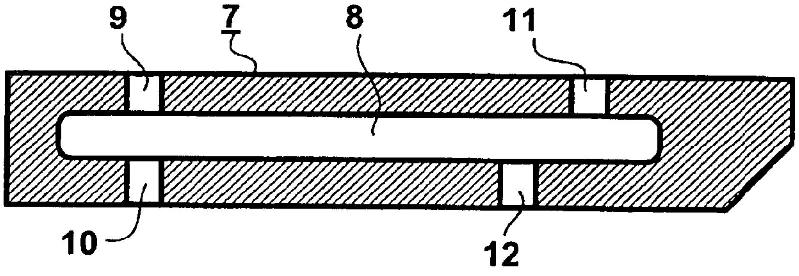
FIG. 3 schematically shows a third embodiment of a connecting bar, with one cavity and fastening bores.

FIG. 3 shows a third embodiment of a connecting bar 7 for electrical appliances and devices with preferably one cavity 8, which extends essentially over its entire dimension. This connecting bar 7 includes bores 9; 10; 11; 12, which are provided for fastening purposes and, if appropriate, have a thread. In the example, the bores 9 and 10 are arranged in a common axis, which is required when through-bolts are used, and the bores 11 and 12 are arranged offset, which may be expedient for example when individual bolts are used. These bores are then provided with a thread.

Figure 4:
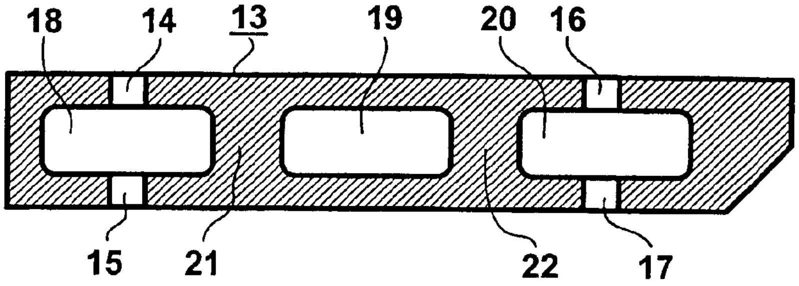
FIG. 4 schematically shows a fourth embodiment of a connecting bar, with a plurality of cavities.

FIG. 4 shows a fourth embodiment of a connecting bar 13 for electrical appliances and devices with a plurality of cavities 18; 19; 20, between which webs 21; 22 are provided. In this connecting bar 13, bores 14; 15; 16; 17 are provided in the region of the cavities 18, 19 and 20. The webs 21 and 22 serve for increasing the strength and for the purpose of avoiding deformation of the hollow connecting bar 13 caused by the clamping force or loading of the screw bolts led through these bores 14 to 17 or bolts screwed into the thread of these bores 14 to 17.

Figure 5:
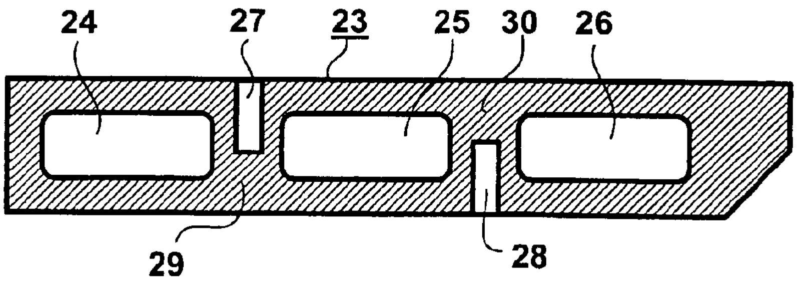
FIG. 5 schematically shows a fifth embodiment of a connecting bar, with a plurality of cavities.

FIG. 5 shows a fifth embodiment of a connecting bar 23 for electrical appliances and devices, with a plurality of cavities 24; 25; 26. In the case of this embodiment, the bores 27; 28, provided with a thread which is not represented, are arranged in such a way that they are located in a web 29; 30. As a result, greater thread lengths are possible, which makes it possible for the screwed connections to be subjected to higher loading.

Figure 6:
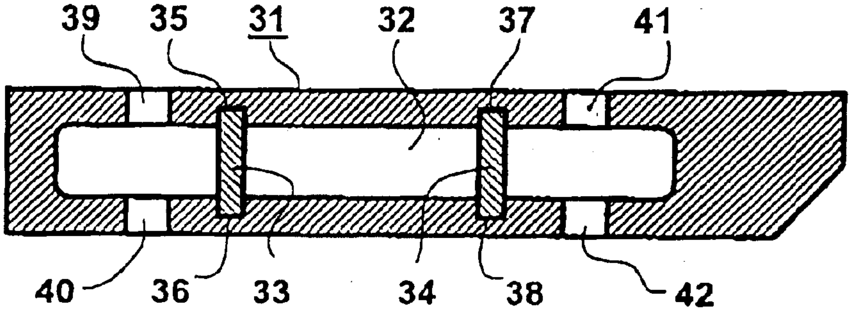
FIG. 6 schematically shows a sixth embodiment of a connecting bar, with one cavity and supporting webs which can be pushed in arranged therein.

FIG. 6 shows a sixth embodiment of a connecting bar 31 for electrical appliances and devices, with a cavity 32 extending essentially over the entire extent of the connecting bar 31. In the case of this embodiment, the profiled semi-finished material has guiding grooves 35; 36; 37; 38, which are arranged transversely with respect to the longitudinal axis and into which supporting webs 33; 34 can be pushed as and when required. The supporting webs 33; 34 which can be pushed into these guiding grooves 35; 36; 37; 38 may include the same material as the connecting bar 31, but may also include a different material.

These pushed-in supporting webs 33; 34 serve the same purpose as the molded-on supporting webs, that is to stabilize the connecting bar 31 against deformation of the hollow connecting bar 31 caused by the clamping force or loading of screw bolts led through the bores 39; 40; 41; 42 or bolts screwed into the thread of these bores. However, it is possible for no bores to be arranged in them.

Figure 7:
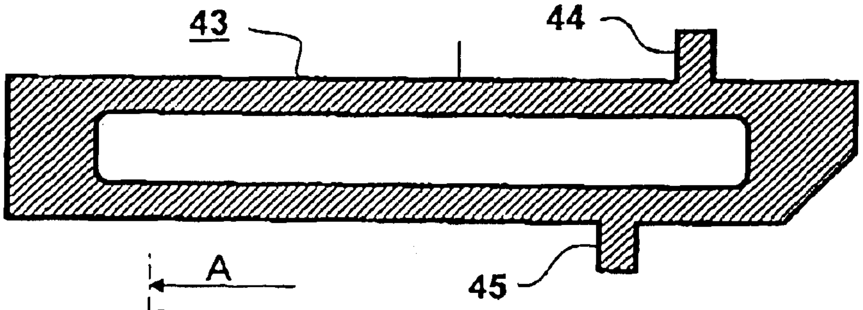
FIG. 7 schematically shows a seventh embodiment of a connecting bar, with stops for axial fixing.

FIG. 7 shows a seventh embodiment of a connecting bar 43 for electrical appliances and devices with stops 44; 45 for axial fixing of the connecting bar 43 in the corresponding housing. By use of these stops 44; 45, the connecting bar 43 is fixed in the axial direction by suitable fastening elements, for example clamping bolts. At the same time or in addition, these stops 44; 45 can absorb axial forces and transmit them to the housing.

Figure 8A:
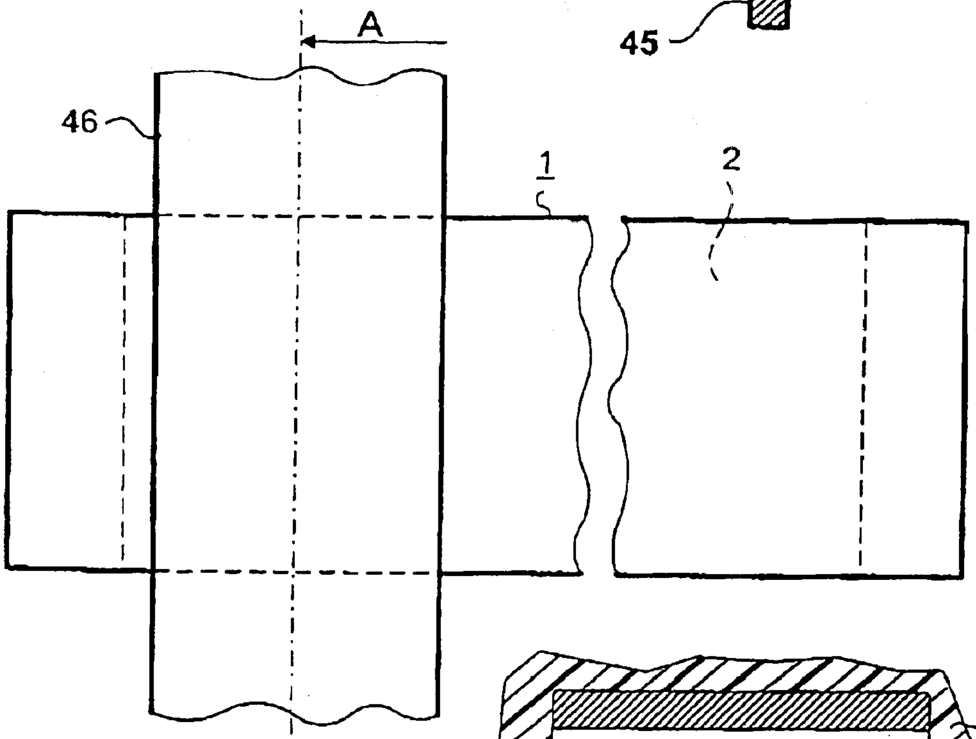
In FIG. 8, a connecting bar is shown in plan view, with an indicated device wall.
Figure 8B:
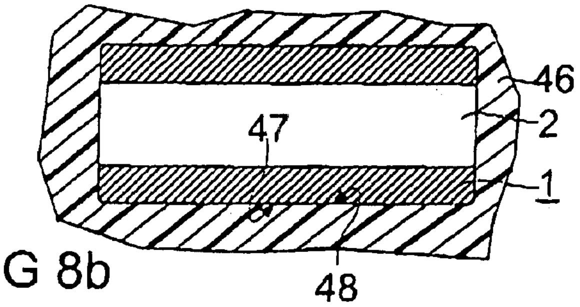

FIG. 8*a* schematically illustrates one of the connecting bars described above, for example the connecting bar 1 (FIG. 1), in plan view. FIG. 8*b* illustrates a cross section in A—A of FIG. 8*a*. As can be seen, the cavity 2 extends transversely with respect to the longitudinal direction and is open on both sides. Also indicated is a wall of a device housing 46 with a window opening 47, through which the connecting bar 1 extends, wherein the window opening 47 is adapted to the outer contour 48 of the connecting bar 1.

The advantages of the solution according to the invention are that standard outer dimensions of the connecting bars can be achieved within one overall size, dispensing with the need for spacers and the like. Standard insertion openings, and consequently standard housing dimensions, can be used within one overall size, which has the consequence of greatly reducing the range of different variants and of reducing costs. The bores of the hollow profiles may be punched, which is less costly and neater than drilling. The connecting technique is simplified to one variant for each overall size, thereby simplifying production. The greatly enlarged surface of hollow profiles which are open at the sides has the effect of better heat dissipation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A connecting bar for connection of electrical components of electrical appliances and devices to an external circuit comprising: an outer contour for accommodation through a window opening in a wall of the appliances or devices, wherein the connecting bar is hollow, with a similar outer cross section to other connecting bars, with a cross-sectional surface of a remaining wall thickness sized according to a respective nominal current, wherein the connecting bar includes at least one bore for fastening purposes, wherein the at least one bore is threaded and wherein the connecting bar is open on the sides.

2. The connecting bar as claimed in claim 1, wherein the connecting bar includes only one cavity.

3. The connecting bar as claimed in claim 1, wherein the connecting bar includes a plurality of cavities.

4. The connecting bar of claim 3, including a plurality of webs, each between cavities, for increasing strength.

5. The connecting bar as claimed in claim 1, wherein the at least one bore includes at least two bores and wherein one of the at least two bores is on an upper side and another of the at least two bores is on an underside, arranged in a common axis.

6. The connecting bar as claimed in claim 1, wherein the at least one bore includes at least two bores and wherein one of the at least two bores is on an upper side and another of the at least two bores is on an underside, arranged offset with respect to one another.

7. The connecting bar as claimed in claim 1, wherein the connecting bar includes a plurality of cavities, between which, at least one suitable web is included for increasing strength.

8. The connecting bar as claimed in claim 7, wherein the at least one bore in the connecting bar is arranged in the region of one of the plurality of cavities.

9. The connecting bar as claimed in claim 7, wherein the at least one bore in the connecting bar is arranged in the web.

10. The connecting bar as claimed in claim 1, wherein the at least one bore in the connecting bar is arranged in a web.

11. The connecting bar as claimed in claim 1, including at least one stop for axial fixing.

12. The connecting bar as claimed in claim 1, wherein a cavity is arranged transversely with respect to a longitudinal extent of the connecting bar.

13. The connecting bar as claimed in claim 1, wherein the at least one bore in the connecting bar is arranged in the region of a cavity.

14. The connecting bar as claimed in claim 1, wherein at least one bore includes a plurality of bores for fastening purposes.

15. The connecting bar as claimed in claim 14, wherein each of the plurality of bores includes a thread.

16. The connecting bar as claimed in claim 1, including a plurality of stops for axial fixing.

17. A connecting bar for electrically connecting an electrical component and an external circuit, comprising: an outer contour of the connecting bar, the outer contour being shaped irrespective of a nominal electrical current to be passed; and a hollow inner contour of the connecting bar, wherein a thickness of a cross-sectional surface of the connecting bar relates to the nominal current to be passed, wherein the connecting bar includes at least one bore for fastening purposes, wherein the at least one bore is threaded and wherein the connecting bar is open on the sides.

18. A connecting bar for passing current between at least one electrical component of an electrical appliance or device and an external circuit, comprising: an outer contour of the connecting bar for accommodation through a window opening in a wall of the appliance or device, the outer contour being of a shape set irrespective of current to be passed, and a hollow inner contour of the connecting bar, wherein a cross-sectional surface of a thickness of the connecting bar is set relative to the current to be passed, wherein the connecting bar includes at least one bore for fastening purposes, wherein the at least one bore is threaded and wherein the connecting bar is open on the sides.

* * * * *